United States Patent [19]

Batchelder

[11] Patent Number: 4,869,357
[45] Date of Patent: Sep. 26, 1989

[54] OVERRUNNING CLUTCH WITH GROOVED BUSHING FOR RECEPTION OF SPRING COIL

[76] Inventor: James W. Batchelder, R.F.D. 4, Box 47, Chester, Vt. 05143

[21] Appl. No.: 225,428

[22] Filed: Jul. 28, 1988

[51] Int. Cl.$^4$ ............................................. F16D 13/04
[52] U.S. Cl. ............................... 192/41 S; 192/41 R; 192/81 C
[58] Field of Search ..................... 192/41 R, 41 S, 43, 192/81 C

[56] References Cited

U.S. PATENT DOCUMENTS

| | | | |
|---|---|---|---|
| 2,785,587 | 3/1957 | Lowe | 74/650 |
| 2,895,578 | 7/1959 | Winchell | 192/41 S |
| 2,976,976 | 3/1961 | Parker | 192/41 S |
| 3,228,497 | 1/1966 | Shneider | 192/40 |
| 3,327,825 | 1/1967 | Fann | 192/104 R |
| 3,429,408 | 1/1969 | Maker | 192/41 S |
| 3,698,523 | 10/1972 | Bellinger | 192/12 BA |
| 4,313,530 | 2/1982 | Boyd | 192/41 S |
| 4,605,110 | 8/1986 | Boyd | 192/5 |

*Primary Examiner*—Leslie A. Braun
*Assistant Examiner*—Andrea Pitts

*Attorney, Agent, or Firm*—Sughrue, Mion, Zinn, Macpeak & Seas

[57] ABSTRACT

A cylindrical bushing member includes at least one groove of a depth and width to fully accommodate a coil spring within the inner periphery of the bushing with the spring, when relaxed having an inner diameter slightly larger than the diameter of a shaft member projecting axially therethrough. The coil spring is fixed relative to the bushing so as to be non-rotatable relative thereto. The coil spring has at least one end in contact with the periphery of the shaft for frictional engagement therewith such that relative rotation of the bushing and the shaft in one direction causes multiple turns of the coil spring to engage the periphery of the shaft and to snub the spring and to cause a driving member to rotate a driven member as fast as that of the driving member, but permit the driven member to rotate faster and free-wheel to overrun the driving member. Additional turns of wire of the coil spring may be wrapped about the outer periphery of the bushing within an outer peripheral groove with the free end thereof engaging the outer periphery of the outer peripheral groove wall to snub the outer turns of spring wire to effect a grip between the outer turns of the wire coil spring and the bushing during clutching operation of the clutch.

7 Claims, 2 Drawing Sheets

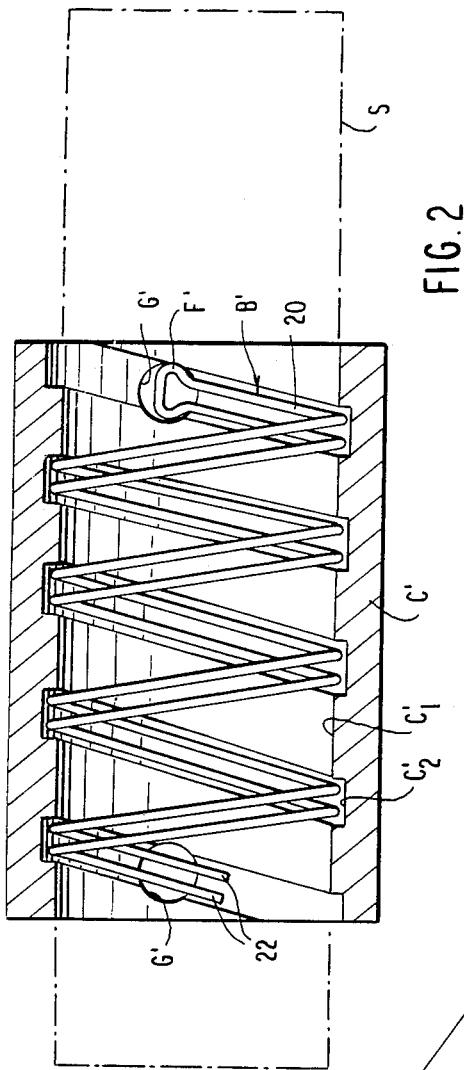
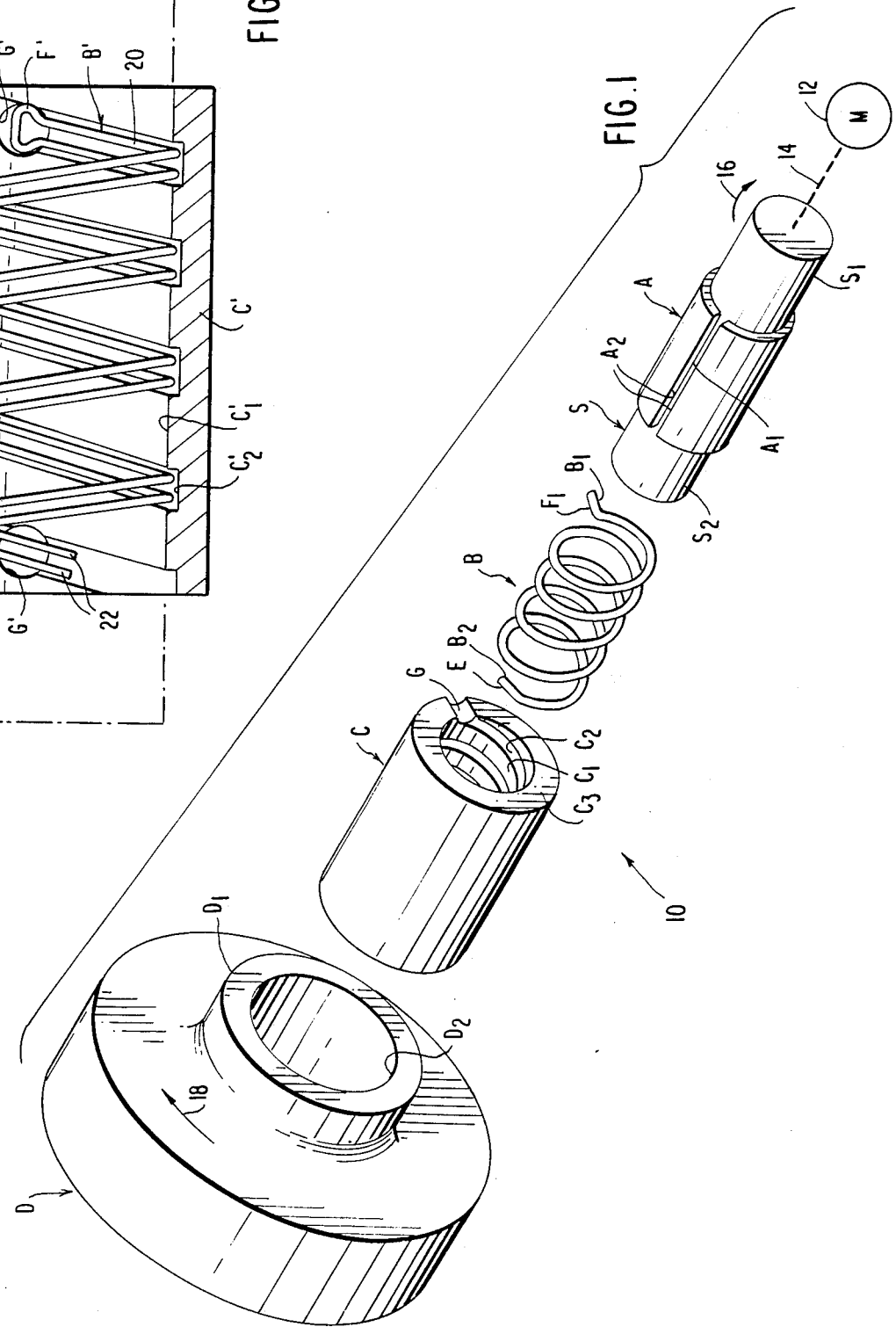

OVERRUNNING CLUTCH WITH GROOVED BUSHING FOR RECEPTION OF SPRING COIL

FIELD OF THE INVENTION

This invention relates to an overrunning clutch of the type having a coil spring interposed between concentric cylindrical bushing and shaft members, and more particularly to an overrunning clutch which insures correct positioning of the coil spring in either clutch or declutch modes.

BACKGROUND OF THE INVENTION

Overrunning or freewheeling clutches have developed over the years utilizing one or more inexpensive metal coil springs as an active clutching element and drive member between a shaft and a concentrically mounted cylindrical bushing, or between axially aligned shafts with the coil spring concentrically surrounding abutting portions of the aligned shafts. Particularly where one of the shaft and concentric bushings is the driving member, and the other a driven member, the coil spring is interposed concentrically between the two members, is affixed at one end to one of the members and, depending upon the direction of rotation of the driven shaft, frictionally engages the surface of the other driven member to drive the driven member in the same direction of rotation. Drive is disconnected by overrunning as a result of excessive speed of the driven member. Such action is accomplished by radial expansion of the coil spring. With the coil spring concentrically surrounding the shaft and interposed between the shaft and inner periphery of the outer concentric cylindrical bushing, sometimes during disconnect or overrunning action, the spring jams between the shaft and bushing with a non-release of the clutching action in spite of desired free-running.

U.S. Patents which are exemplary of such spring coil overrunning clutches are U.S. Pat. Nos.: 3,228,497 issued Jan. 11, 1966; 3,327,825 issued June 27, 1967; 2,785,587 issued Mar. 19, 1957; and 3,698,523 issued Oct. 17, 1972.

It is therefore a primary object of the invention to provide an overrunning clutch using a metal coil spring interposed between a shaft and a concentrically mounted cylindrical bushing of slightly larger diameter, in which the positioning and mounting of the spring to the cylindrical bushing is easily accomplished, positively maintained irrespective of whether the clutch is in active clutch or declutched condition, wherein the spring cannot be inadvertently disconnected from the bushing during clutch operation or termination of clutching and which prevents the inadvertent jamming of the coil spring between the shaft and bushing and non-release of the clutch under desired free-running conditions.

BRIEF DESCRIPTION OF THE DRAWINGS

FIG. 1 an exploded view of an overrunning clutch forming a preferred embodiment of the invention.

FIG. 2 longitudinal sectional view of the shaft, bushing and coil spring of a clutch forming a second embodiment of the invention.

DESCRIPTION OF THE PREFERRED EMBODIMENT

Figure 3:
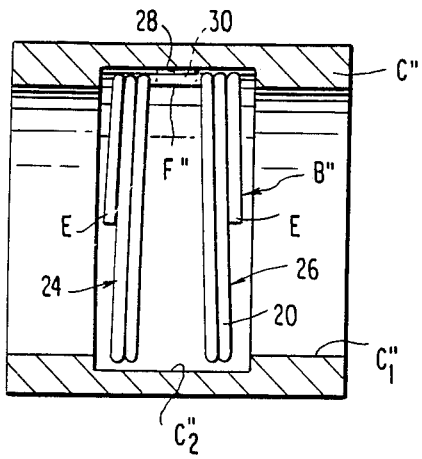
FIG. 3 is a longitudinal sectional view of a bushing and a coil spring mounted therein of a clutch forming yet another embodiment of the invention.

Referring first to the embodiment of FIG. 1, the overrunning clutch indicated generally at 10 includes a driven member in the form of a cylindrical shaft S of relatively small diameter, driven by an electrical motor 12 through a mechanical connection indicated schematically by the dotted line 14 such that the shafts may be rotated clockwise as indicated by the arrow 16. Shaft S has opposite ends $S_1$, $S_2$. Mounted concentrically about the outer periphery of the shaft S, is sleeve A preferably made of a hard, strong, wear-resistant and inexpensive spring steel or like hard metal in the form of a strip or plate. The plate is bent or rolled to cylindrical form and has an inner diameter which is slightly smaller than the diameter of shaft S, and is concentrically positioned thereon. As a result, the thin metal sleeve A hugs the shaft snugly. To assure such a grip, a narrow gap $A_1$ is left between the facing ends $A_2$ of the sleeve so the ends will not but against each other and thereby prevent the hard metal sleeve A from hugging the shaft S. In applications where such a gap $A_1$ might be objectionable, a hardened, seamless sleeve having a smooth cylindrical outer surface can be press fitted on the relatively soft shaft S.

The next element of the clutch 10 as shown in FIG. 1, is a helical coil spring B, preferably made of piano wire or the like, which is hard, strong, wear-resistant and inexpensive. The inner diameter of the coil spring B, when relaxed, is slightly larger than the outer diameter of the shaft S (or the thin, hard metal sleeve A if the sleeve A is used). It is not necessary for the clutching action that a sleeve A be provided on the outer periphery of shaft A. In the embodiment of FIG. 1, one end $B_1$ of the spring is bent radially outward so as to project into a radial hole or opening G within the cylindrical bushing C which concentrically surrounds the coil spring B with the coil spring B in turn, concentrically surrounding shaft S and the thin hard metal sleeve A, if such sleeve A is employed. The coil spring B has its other end $B_2$ bent inwardly to a small degree at E to provide a slight frictional drag on the shaft S or sleeve A. This drag should exceed the slight resistance of the coil spring turns to wrap tightly around the shaft S or sleeve A for constricting or snubbing of the shaft S or sleeve A, similar to the action of capstans.

Experiments have shown that by controlling the inner diameter of the coil spring B to close tolerances, the bent end $B_2$ of the coil spring B may not need to be bent inwardly to cause the spring B to grip the shaft S or sleeve A to initiate the snubbing action when the spring is fairly snug about sleeve A or shaft S. The opposite bent end $B_1$ of the coil spring forms a tongue at $F_1$ is fastened to the end of the cylindrical bushing or to the large diameter outer cylindrical member D such as by bending or forming a loop in the end of the spring to engage a notch hole or pin in either of the bushing C or the outer member D of the clutch.

The bushing C is of an axial length on the order of that of the coil spring B. It has an inner diameter which is less than the inner diameter of the coil spring B when the coil spring is relaxed. Within the inner periphery $C_1$ of the bushing, there are provided one or more internal helical grooves $C_2$ having a helix corresponding to the spring B. Preferably the sleeve bearing or bushing C is made of bronze or other suitable bearing material, and preferably it is press fitted in bore $D_2$ of the outer member D to resist relative movement therewith. Other means may be provided for fixing the bushing or bearing C within the bore of the outer member D. The groove or grooves $C_2$ should be a little wider and deeper than the diameter of the spring wire forming coil spring B, such that the coil spring B does not bind in the grooves $C_2$ and can expand away from the shaft S or sleeve A under overrunning conditions. In the embodiment of FIG. 1, the cylindrical bushing C is slotted radially as at G on end $C_3$ to receive the bent tongue $F_1$ formed by the bend end $B_1$ of the spring B. The bore $C_1$ of bushing C provides a running fit on either shaft S or sleeve A. That is, in the absence of constriction of the coil spring B the shaft S or sleeve A (if employed) slides relative to bore $C_1$ of the bushing C.

The outer member D may be a gear, pulley, driven wheel, sprocket or the like. As shown, the outer member D is of cylindrical shape, having an axially projecting hub $D_1$ and has an axial bore $D_2$ within which the bushing C is preferably press-fit. The outside diameter of the bushing C is very slightly in excess of the diameter of bore $D_2$ of the outer member D. As may be appreciated, the overrunning clutch 10 is a clutch wherein the driven member must rotate as fast as the driving member but the driven member is free to rotate faster than the driving member. It may also serve as a ratchet or a device to prevent a mechanism from running backwards when the power fails or is shut off. In action, therefore, when shaft S is the driving member as shown by the set-up and rotates clockwise in the direction of the arrow 16, the slight drag of the bent end $B_2$ of the spring at E on shaft S or sleeve A, causes the spring coil B to tightly wrap around, snub and constrict the sleeve A. The tongue $F_1$ on the spring B by being fixably engaged in slot G in bushing C, also rotates the driven member (bushing C and outer member D) in the direction of arrow 18. However, if the outer member D rotates faster than shaft S, the constricting action of the spring B is released with the loops of the coil spring B radially expanding and the clutch becomes free-wheeling or overrunning.

Such would occur if two such clutches 10 were substituted for a much more expensive gear differential, with one clutch 10 secured to each driving wheel. When going around the curve, the wheel on the outside of the curve can overrun or rotate faster than the other wheel on the inside of the curve, similar to the rear wheels of automobiles.

When outer member D is the driver and rotates in a counterclockwise direction, with the drag of the bent end $B_2$ on the sleeve A and with the bushing C driving the fixed end $B_1$ of the coil spring at tongue $F_1$, the shaft S becomes the driven member. In similar fashion, if the shaft S is rotated faster under a reverse mode in a counterclockwise direction where the outer member D becomes the driving member, the device again becomes free-wheeling or overrunning.

Referring next to FIGS. 2 through 8, inclusive, there are illustrated modifications of the various components of the clutch 10 of FIG. 1 and forming additional embodiments of the invention. In these Figures, like elements have like lettered or numerical designations. In FIG. 2, which is a longitudinal cross-section of bushing C supporting a modified form of spring B', the shaft S is shown in dotted lines so as to permit viewing of the spring and its nature of positioning and mounting within the helical groove $C_2$ within the inner peripheral surface or bore $C'_1$ of the bushing C'. In this case, the groove $C'_2$ is of rectangular cross section, is of double width, is of extended width, and the spring B' is of special construction. The two circular holes G' which extend radially through the side wall of the bushing are of a diameter in excess of the width of the groove $C'_2$. Further, the circular, radial holes G' do not open to the ends of the bushing C' and are longitudinally in line with each other. The spring B' is formed of piano wire, which is looped at its center to form a headed end or tongue F' of loop form, and of a diameter equal to or slightly larger than the diameter of the radial holes G'. As such, the headed ends of loop F' snugly fits one of the radial holes G' through the wall of the bushing with the connection preventing the spring B' from rotating in either direction in the bushing such that the spring cannot screw out of the bushing groove $C'_2$. In the relaxed state, the inner diameter of the spring B' is slightly in excess of the diameter of shaft S. By having two holes G' near opposite ends of the bushing C', this permits the rotational direction of the clutching action to be reversed simply by turning the spring end for end in the bushing with the helical wrap opposite to that as shown. The bronze bushing C' is subject to easy machine grooving. For the various embodiments of the invention of FIGS. 2 through 7, with sufficient turns of the coil spring B' or the like, as per FIG. 2, around the shaft S, the tangential torque transmitting capacity of the clutch 10 approaches the high tensile strength of the piano wire from which the spring is made. Consequently, the strength of the connection between the ends of the spring B' and the bushing C' should be as close as possible to the strength of the spring wire. Although the bent end $B_1$ of the spring forming tongue F and the notch G receiving it in the bushing C of FIG. 1 provides an effective connection between one end of the spring and the bushing, the embodiment of FIGS. 2 through 7 shows a connection which obtains a very substantial increase in strength. A simple hook-type loop F' may be employed at one end of the spring by doubling back the piano wire 20 forming the helical coils of the coil spring B'. In the embodiment of FIG. 2, this forms essentially a single spring, but of two parallel sections of the piano wire 20 from the head F' toward the free ends 22 thereof. The free ends 22 of the piano wire are preferably bent inwardly slightly toward the axis of the assembly. In contrast to the embodiment of FIG. 1, where a simple hook-type of loop in the end of the spring could pull out under high spring tension, if both ends 22 of the loop are also clutching members, the tension in the spring wire 20 on either side of the anchoring means F', G' becomes equalized.

Figure 4:
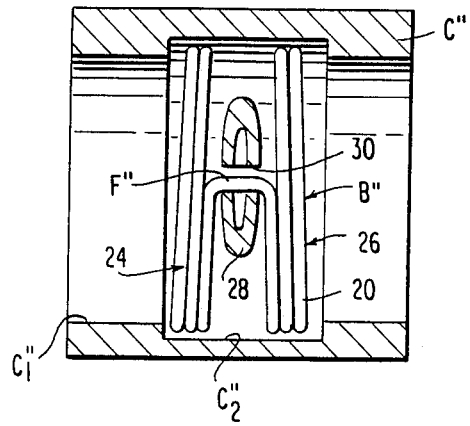
FIG. 4 is a longitudinal sectional view at right angles to that of FIG. 3.

Turning next to FIGS. 3 through 7, in contrast to FIG. 2 where the center loop F' is at one end of the helical coil spring, the center loop may be in the center of the length of piano wire, thereby forming a double spring from a single length of piano wire 20, wound as opposite hands. In both the embodiments of FIG. 2 and those of FIGS. 3 through 7, all spring arrangements utilize the full strength of the loop in the spring wire 20. In the embodiment of FIGS. 3 and 4, bushing C" is of somewhat shorter axial length, is provided with a smooth interior bore C"$_1$ and a single circular groove C"$_2$ which is of considerable axial length, sufficient to accommodate the close turns of the right and left hand sections 24, 26 of the double spring B". The spring loop in this case F" is an axial section of the piano wire 20. Further, the turns of the double spring B" are of an outside diameter which is slightly less than the diameter of the single inner peripheral groove C$_2$" within bushing C". Each of the double spring sections 24, 26 terminate in slightly bent ends E, as in the other embodiments, for contacting and dragging on the periphery of the thin, hard metal sleeve A or shafts in the structure of FIG. 1 and replacing the bushing C and coil spring B of that embodiment. In order to hold the spring B" in position, there is provided an indentation 28 within the sleeve C" over a circumferential extent of the bushing and an axial groove or slot 30 extends therethrough, FIG. 4, which receives the axial portion of the piano wire 20 joining the two double spring sections 24, 26 which are positioned within the circumferential groove C$_2$" of two opposite sides of the anchoring means formed thereby.

For the embodiments of FIGS. 3 and 4, the shaft S is purposely not shown, although passing through bore C$_1$" and interiorly of the opposite hand turns of piano wire 20 forming the double spring sections 24, 26.

Figure 5:
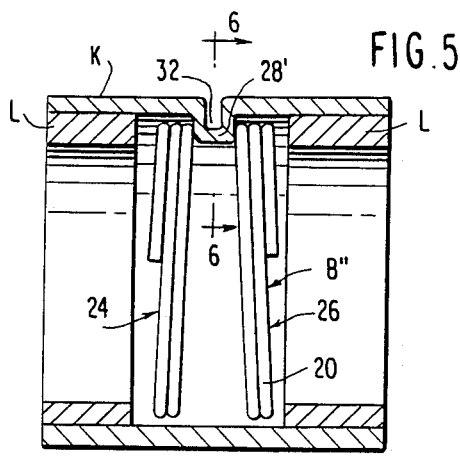
FIG. 5 is a longitudinal sectional view of a cylindrical bushing mounting a double coil spring, forming yet a further embodiment of the invention.
Figure 6:
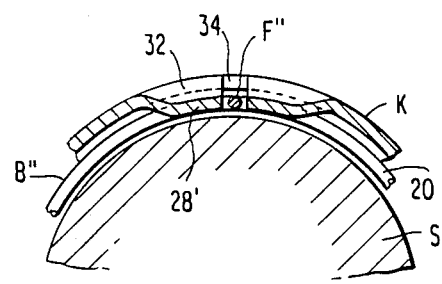
FIG. 6 a transverse sectional view of the bushing and spring about line 6—6 of FIG. 5.
Figure 7:
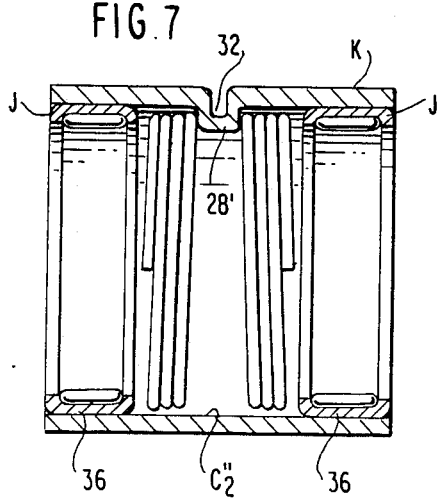
FIG. 7 is a longitudinal sectional view of a cylindrical bushing and a double coil spring similar to that of the embodiment of FIGS. 5 and 6 with antifriction bearings mounted at opposite ends of the bushing, adjacent the opposite sides of the double coil spring and forming yet a further embodiment of the invention.

An additional requirement to insure the connection having maximum strength concerns the strength of the material to which the spring wire 20 is anchored. In the embodiment of FIG. 2, the loop or headed end of the spring is secured in a hole G' in a bronze anti-friction bushing C'. The physical strength of the bronze is far less than that of the spring piano wire 20. In the embodiment of FIGS. 5 and 6, instead of a one-piece bronze bushing C" as per the embodiment of FIGS. 3 and 4, a cylindrical steel sleeve K having far higher physical strength, of an outside diameter equal to the outside diameter of bushing C" and an inside diameter in excess of that of C$_1$" of FIG. 3, is utilized to anchor the double spring B". Additionally, the inner diameter of the steel sleeve K is generally equal to the diameter of bushing C" at the groove C$_2$". However, in the embodiment of FIGS. 5 and 6, a pair of separate bronze bushings L having an outside diameter slightly larger than the inside diameter of the steel sleeve K are provided and are press-fitted within opposite ends of the steel sleeve K with the strength of the connection between the double spring B" and the steel sleeve K being materially increased. In that respect, a circumferential indentation 32 is provided within the steel sleeve K over a small circumferential extent forming a radially inward projection or indentation 28'. A transverse slot is formed at 34 passing through indentation 28' to permit the passage of the loop F" joining the two double spring sections 24, 26 as per FIG. 6. The slot or hole 34 is required to be of a width in excess or the same as the diameter of the piano wire 20 forming the double spring B". Additionally, the torque transmitting capacity of the clutch is materially increased by using the double spring B". In FIG. 7, the arrangement is the same with the exception that high capacity needle bearings J are substituted for the dual bronze bushings L of the embodiment of FIGS. 5 and 6. In this case, the outer race 36 of the needle bearing is of a diameter slightly larger than the inner diameter of the steel sleeve K and the needle bearings J are press-fitted into opposite ends of the steel sleeve K while the double spring B" fits into the annular groove C$_2$" in the same manner as it occurs in FIGS. 3 through 6, inclusive.

Figure 8:
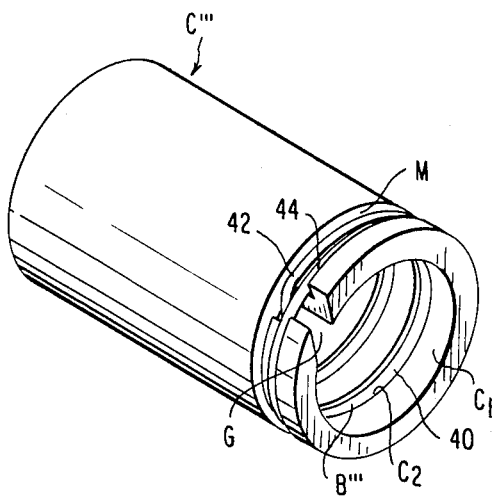
FIG. 8 is a perspective view of an alternate form of bushing for an overrunning clutch of FIG. 1 and forming yet an additional embodiment of the invention.

Referring next to FIG. 8, a bushing C of the first embodiment is replaced by bushing C'''. The outer diameter and axial length and is the same as that of the embodiment of FIG. 1, the helical groove C$_2$ is the same and the bore C$_1$ is also the same. The difference is the treatment provided to the outer periphery of the bronze bushing for increasing the strength of the connection between the bearings C and the coil spring B. This involves the addition of an annular groove M within the outer periphery of the bushing C''' to a depth slightly deeper than the diameter of the spring wire, and wide enough to accommodate at least one but preferably two or more turns of the piano wire. In this case, the coil spring B''', at the last full internal turn 40, at the end of the bushing C''' bearing the radial slot G, a portion 42 extends radially upwardly through the slot G, and terminates in a pair of additional turns 42 and 44 which lie side by side, and within the circumferential groove M. The length of the spring B''' is extended from that shown at B in FIG. 1, with the additional turns 42, 44 positioned within the exterior groove M within the outer periphery of the bushing C'''. Turns 42, 44 wrap about the exterior of the bushing to provide a constricting or snubbing action for that end of the coil spring B''' similar to and exceeding the same gripping action between the spring B''' at its opposite end and the sleeve A or the shaft S.

In the various embodiments, the action and operation of the clutch is essentially the same. Further, while the multiple embodiments of the invention have been shown and described, additional modifications thereof may be made by one skilled in the art without departing from the spirit of the invention, and it is desired to cover by Letters Patent, all forms of the invention falling within the scope of the following claims:

What is claimed is:

1. In an overrunning clutch comprising a rotatable shaft member,
  a rotatable cylindrical bushing member concentrically mounted on said shaft member and having an inner diameter slightly larger than the outer diameter of the shaft member, and
  a coil spring concentrically interposed between said shaft member and said bushing member, having one portion positively affixed to one of said members and at least one end in frictional contact with the other member, and
  a means for applying power to one of said members to drive the other member by frictional drag through said spring by snubbing of the coil spring about said driven member such that the driven member must rotate as fast as the driving member, but the driven member is free to rotate faster than the driving member and can overrun the same,
  the improvement wherein said bushing member includes a groove of a depth and width to fully accommodate the spring during relaxation upon overrunning to facilitate desired clutch action, and means in said bushing member for fixedly mounting and positioning of said helical coil spring, and maintenance of connection between said coil spring and said member connected thereto.

2. The overrunning clutch as claimed in claim 1 wherein said groove is a helical groove, said bushing comprises a radial hole, and said coil spring has one end terminating in a radially bent portion fitted radially into said hole.

3. The overrunning clutch as claimed in claim 2 wherein a pair of longitudinally aligned radial holes of circular cross-section extends through the wall of the bushing, said coil spring comprises a single length of wire having a loop at its middle and parallel helical turns sized to the radius of the helical groove within said bushing, and of similar pitch, such that said loop is at one end of the spring, and a pair of free ends are at the opposite end, and wherein the rotation direction of the clutching action of the clutch may be reversed by turning the coil spring end for end with said loop fitted at the center of the spring into a selected one of said radial, circular holes.

4. The overrunning clutch as claimed in claim 2 wherein said radial hole is positioned axially inwardly of one end of said bushing, and said bushing further comprises a circumferential groove within the outer periphery of the bushing of an axial depth in excess of the diameter of the spring wire for the coil spring, and of a width in excess of twice the diameter of said spring wire, and wherein said coil spring terminates at one end, in at least two additional circular turns of spring wire integral with and extending from said radial, bent end of said coil spring, and being closely received within the groove on the outer periphery of the bushing member such that during clutching action of the clutch, said at least two additional spring wire coils wrap around the outside of the bushing in said outer peripheral groove to provide a constricting and snubbing action similar to and exceeding a similar action between the coil spring and the shaft.

5. An overrunning clutch comprising a rotatable shaft member, a rotatable cylindrical bushing member concentrically mounted about said shaft member and having an inner diameter slightly larger than the outer diameter of the shaft member, and a coil spring concentrically interposed between said shaft member and said bushing member, and having one end portion positively fixed to one of said members and at least one free end in frictional contact with the other member such that rotation in a predetermined direction of said shaft member relative to said bushing member, said at least one free end of the spring frictionally drags on said other member and snubs the spring about said other member to effect a clutching action between the two members and rotation of one member by the other, and where the driven member is required to rotate as fast as the driving member but the driven member is free to rotate faster than the driving member, the improvement wherein said bushing member includes an annular groove of a depth and width to fully accommodate the coil spring when fully relaxed, and wherein the coil spring comprises a double coil spring having two axially spaced sections of opposite hand concentrically wound about the shaft, and wherein an axial length of wire forms a spring loop connecting said two sections, and wherein means are provided by the bushing member for fixing the loop to said bushing member adjoining said two sections and preventing rotation of said double coil spring about the axis of the bushing during shaft rotation therein.

6. The overrunning clutch as claimed in claim 5, wherein a circumferential projection is provided on the inner periphery of the bushing at the center of the annular groove having an axial hole therethrough receiving the loop connecting the coil spring opposite hand sections to fix said loop to said bushing member, and wherein each section includes a free end in frictional contact with the other member to effect clutching between one of said members acting as a driving member and the other acting as a driven member.

7. The overrunning clutch as claimed in claim 6, wherein said bushing member comprises a hard metal sleeve and a pair of short axial length soft metal cylindrical bushing sections fixably mounted interiorly of the sleeve forming said annular groove therebetween, wherein said radially inner projection comprises a short length circumferential indentation within such sleeve, and wherein an axial groove is formed within the circumferential projection with said loop positioned therein to affix the double coil spring and prevent relative rotation thereof about the axis of said shaft projecting through the double coil spring.

* * * * *